United States Patent
Vahida

(10) Patent No.: US 9,128,208 B2
(45) Date of Patent: Sep. 8, 2015

(54) CATENARY FRONT-END GEAR AND METHOD

(75) Inventor: Behzad Vahida, Massy (FR)

(73) Assignee: CGGVERITAS SERVICES SA, Massy Cedex (FR)

( * ) Notice: Subject to any disclaimer, the term of this patent is extended or adjusted under 35 U.S.C. 154(b) by 650 days.

(21) Appl. No.: 13/477,187

(22) Filed: May 22, 2012

(65) Prior Publication Data
US 2012/0300581 A1 Nov. 29, 2012

(30) Foreign Application Priority Data
May 26, 2011 (FR) .................................. 11 54610

(51) Int. Cl.
*G01V 1/38* (2006.01)

(52) U.S. Cl.
CPC .................................. *G01V 1/3817* (2013.01)

(58) Field of Classification Search
CPC ... G01V 1/3817; G01V 1/3826; B63B 21/663
USPC ............................................ 114/242; 367/16
See application file for complete search history.

(56) References Cited

U.S. PATENT DOCUMENTS

| | | | |
|---|---|---|---|
| 5,616,059 A | 4/1997 | Solomon | |
| 5,913,280 A | 6/1999 | Nielsen et al. | |
| 6,234,102 B1 | 5/2001 | Russell et al. | |
| 6,267,070 B1 | 7/2001 | Russell et al. | |
| 6,285,956 B1 | 9/2001 | Bennett et al. | |
| 6,498,768 B1 | 12/2002 | Gjestrum et al. | |
| 6,504,792 B2 * | 1/2003 | Barker | 367/20 |
| 6,837,175 B1 * | 1/2005 | Gieseke | 114/242 |
| 7,184,365 B2 | 2/2007 | George et al. | |
| 7,221,620 B2 | 5/2007 | Planke et al. | |
| 8,069,006 B1 | 11/2011 | Majzlik et al. | |
| 8,619,496 B2 * | 12/2013 | Hartland | 367/15 |
| 2007/0223306 A1 | 9/2007 | Toennessen | |
| 2009/0279386 A1 | 11/2009 | Monk | |
| 2011/0158045 A1 | 6/2011 | Kalsen et al. | |
| 2011/0286302 A1 | 11/2011 | Welker et al. | |
| 2013/0033960 A1 * | 2/2013 | McKey, III | 367/16 |

FOREIGN PATENT DOCUMENTS

| | | |
|---|---|---|
| EP | 2 343 574 A1 | 7/2011 |
| FR | 2 912 818 A1 | 8/2008 |
| GB | 2 193 476 A | 2/1988 |
| GB | 2 314 627 A | 1/1998 |
| GB | 2 396 696 A | 6/2004 |
| GB | 2 415 258 A | 12/2005 |
| GB | 2 424 949 A | 10/2006 |

(Continued)

OTHER PUBLICATIONS

Search Report issued in corresponding Great Britain Application No. GB1209227.6 dated Sep. 14, 2012.

(Continued)

*Primary Examiner* — Mark Hellner
(74) *Attorney, Agent, or Firm* — Patent Portfolio Builders PLLC

(57) ABSTRACT

Method and catenary front-end gear for towing streamers under water. The catenary front-end gear includes a main cable configured to be attached to a vessel and a device; a connecting system configured to connect streamers to the main cable; and plural streamers. The main cable takes a catenary shape when towed by the first vessel underwater.

20 Claims, 13 Drawing Sheets

(56) References Cited

FOREIGN PATENT DOCUMENTS

| | | |
|---|---|---|
| GB | 2 437 381 A | 10/2007 |
| GB | 2 339 753 A | 2/2009 |
| GB | 2 466 562 A | 6/2010 |
| WO | 99/12055 | 3/1999 |
| WO | 03/075039 A1 | 9/2003 |

OTHER PUBLICATIONS

French Search Report issued in FR Application No. 1154610 mailed Jan. 18, 2012.

Search Report issued in corresponding Great Britain Application No. GB1209227.6 dated Mar. 13, 2013.

* cited by examiner

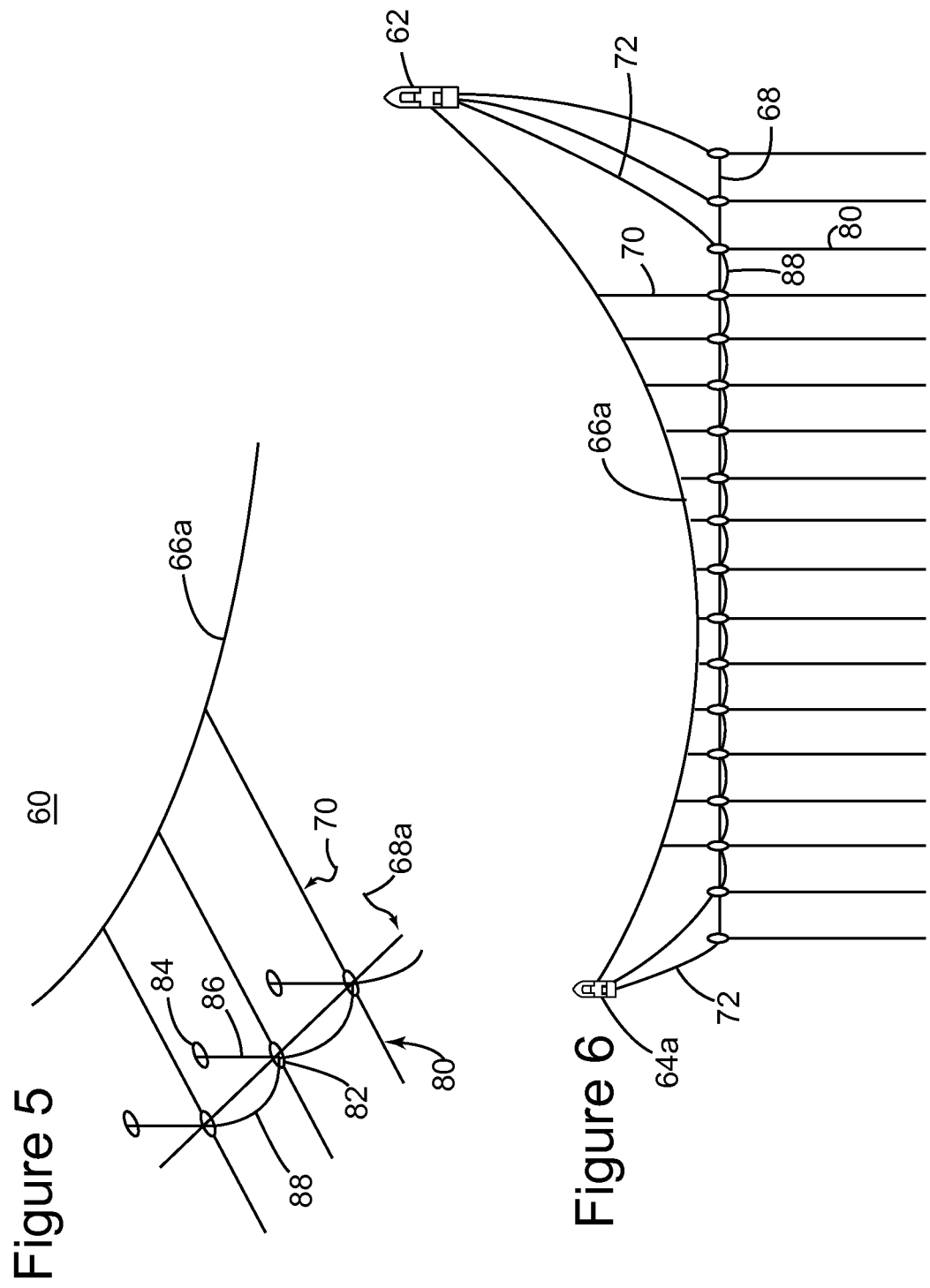

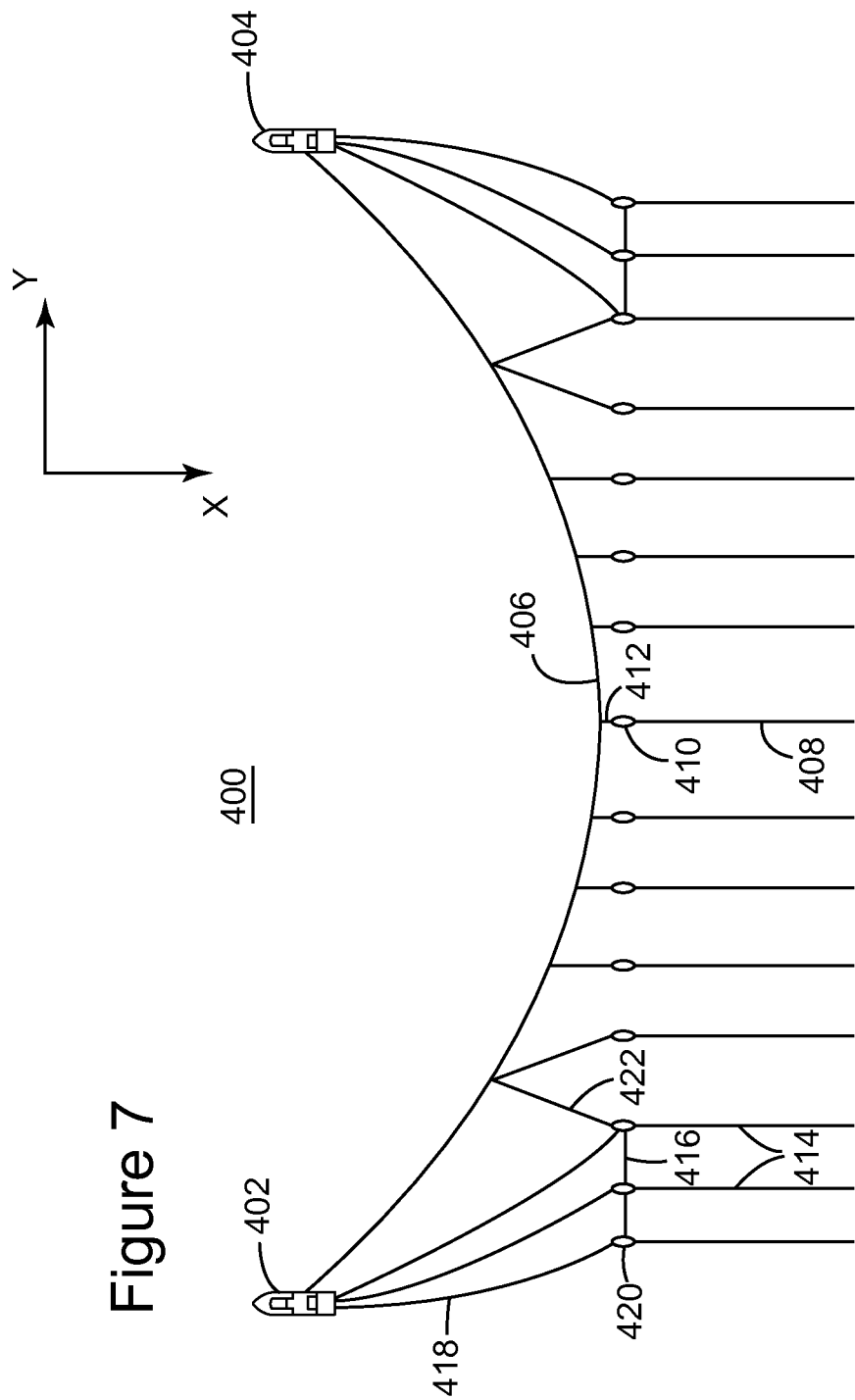

CATENARY FRONT-END GEAR AND METHOD

BACKGROUND

1. Technical Field

Embodiments of the subject matter disclosed herein generally relate to methods and systems and, more particularly, to mechanisms and techniques for towing seismic equipment under water.

2. Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill in order to avoid a dry well.

Marine seismic data acquisition and processing generate a profile (image) of the geophysical structure (subsurface) under the seafloor. While this profile does not provide an accurate location for the oil and gas, it suggests, to those trained in the field, the presence or absence of oil and/or gas. Thus, providing a high resolution image of the subsurface is an ongoing process for the exploration of natural resources, including, among others, oil and/or gas.

During a seismic gathering process, as shown in FIG. 1, a vessel 10 drags an array of seismic detectors provided on streamers 12. The streamers may be disposed horizontally, i.e., lying at a constant depth relative to a surface 14 of the ocean. The vessel 10 also tows a seismic source assembly 16 that is configured to generate an acoustic wave 18. The acoustic wave 18 propagates downwards toward the seafloor 20 and penetrates the seafloor until eventually a reflecting structure 22 (reflector) reflects the acoustic wave. The reflected acoustic wave 24 propagates upwardly until the same is detected by detector 26.

The streamers 12 are shown in FIG. 2 spreading over a predetermined area. This is called the seismic spread. In order to maintain the plural streamers 12 substantially parallel and at equal distance from each other, various front-end gears are used. Streamers 12 are spread out to a desired width to provide measurements of the geological conditions over an acquisition area.

An example of a front-end gear 30 is shown in FIG. 2. The front-end gear 30 is provided between the vessel 10 and the various streamers 12 and this gear is configured to achieve the desired positioning for the streamer heads. FIG. 2 shows the front-end gear 30 to include cables 32 connected between the vessel 10 and deflectors 34. Deflector 34 is a structure capable of generating the necessary lift when towed to keep the streamers deployed in the transverse direction with respect to the sailing line of the towing vessel 10. Spacers 36 are attached to the cables 32 for distributing the lift force among them in order to obtain a substantially linear profile for the position of the streamer heads.

As said above, to spread the streamers transversely in relation to the seismic vessel, the deflectors 34 are usually used. Such deflectors are traditionally passive devices including one or more wings providing a lift in the required direction. Because of the towing resistance in the water, caused both by the deflector and the towed cables, there are, however, limits to the lift which may be obtained using passive deflectors. Thus, due to the limited lift that can be generated by the deflectors, a width of the seismic spread is also limited, which is undesirable. When the deflector is used in seismic surveys it will in addition be loaded with the streamers to be pulled sideways. Thus, there is a limit to the width of the cable tow with passive deflectors.

Another conventional configuration that is presently in use is shown in FIG. 3. FIG. 3 shows a vessel 40 towing two ropes 42 provided at respective ends with deflectors 44. Plural lead-in cables 46 are connected to streamers 50 (e.g., they may form a single cable). The plural lead-in cables 46 also connect to the vessel 40. The streamers 50 are maintained at desired separations from each other by separation ropes 48. Plural sources 52 are also connected to the vessel 40. However, this configuration introduces a large drag. Although the positioning of the streamers may be good, this configuration introduces high internal forces and high resulting stresses in the lines (cables/ropes) and connection means. This results from the raying pattern and the highly constrained geometry where everything is connected by tensioned lines.

Further, the processing techniques for seismic data require longer and more streamers, which only increase the load (due to their drag) of the surveying vessel that tows the streamers. However, as the towing vessel has a limited power availability, the large drag needs to be reduced. Accordingly, it would be desirable to provide systems and methods that provide the operator of the vessel with the capability to use long streamers and an increased number of streamers if so desired.

As the use of the seismic vessel is expensive, it is advantageous to make the width of the spread as large as possible, with a large number of streamers, so that one vessel pass covers an area as large as possible. In this regard, ultra-wide-tow seismic spread using more than 20 streamers is targeted but is something unfeasible using conventional front-end gear architectures. An illustrative configuration in this case could be one with 30 streamers, each having a length of up to 8000 m and a separation between the streamers in the order of 100 m. A short hand for such configuration is 30×8000×100.

On the other hand, for doing dense acquisition, smaller separation between streamer heads is required, for example in the range of 25 to 50 meters. This configuration is difficult to achieve using conventional front-end gears. An exemplary application for this type of acquisition is the configuration composed of 20 streamers, each streamer being 6000 m long and having a separation between streamers of 25 m, i.e., 20×6000×25.

For very wide and low density acquisitions a very large separation is to be used for streamers, in the order of 200 to 300 meters. Here too there are difficulties when using the conventional front-end gears. A typical application in this case would be one with 10 streamers, each streamer being 10000 m long and the separation between the streamers is in the range of 300 m, i.e., 10×10000×300.

SUMMARY

According to an exemplary embodiment, there is a catenary front-end gear for towing streamers under water. The catenary front-end gear includes a main cable configured to span between a first vessel and a device; a connecting system configured to connect plural streamers to the main cable; and the plural streamers. The main cable takes a substantially catenary shape when towed by the first vessel underwater.

According to another exemplary embodiment, there is a method for adjusting a position of a streamer when towed under water. The method includes a step of towing a main cable with at least one vessel so that the main cable has a catenary shape; a step of attaching the streamer to the main cable with a connection and control system; and a step of controlling a position of the streamer relative to the at least one vessel.

According to yet another exemplary embodiment, there is a hybrid front-end gear for towing plural streamers underwater along an X axis. The hybrid front-end gear includes a first cable configured to connect to a first vessel and a second vessel; transversal ropes configured to extend along an Y axis that is substantially perpendicular to the X axis; and links configured to connect the transversal cable to the first cable. The first cable takes a catenary shape when towed underwater and the transversal ropes are substantially straight and is the plural ropes are configured to connect to the plurality of streamers.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5 is a detailed view of a part of a catenary cable according to an exemplary embodiment;

FIG. 6 is a top view of a seismic data acquisition system having a catenary cable according to an exemplary embodiment;

FIG. 7 is a top view of another seismic data acquisition system according to an exemplary embodiment

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a front-end gear for towing plural streamers. However, the embodiments to be discussed next are not limited to these structures, but may be applied to other structures that are capable to tow seismic sources or other seismic related equipment.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
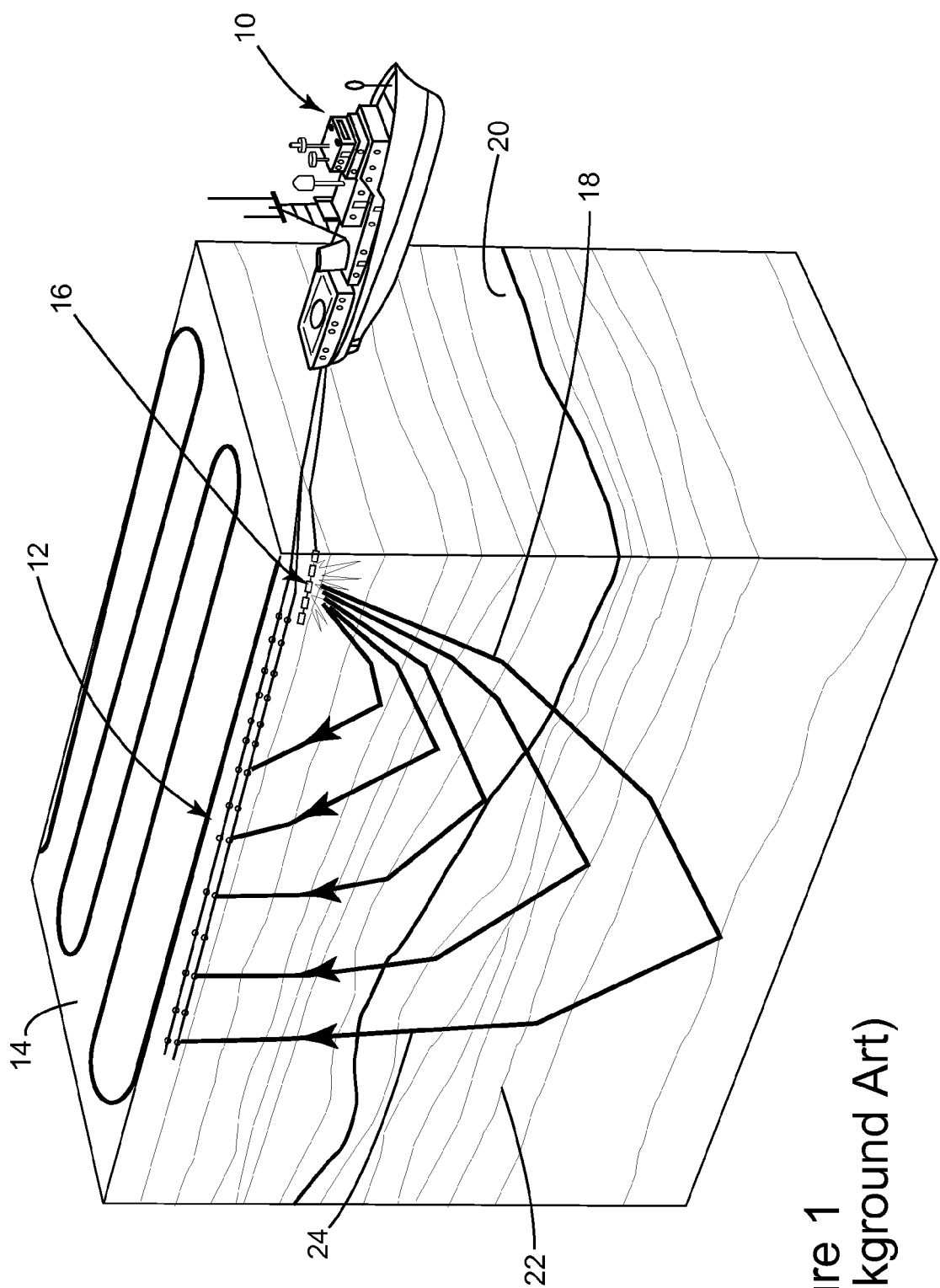
FIG. 1 is a schematic diagram of a conventional marine seismic acquisition configuration.
Figure 2:
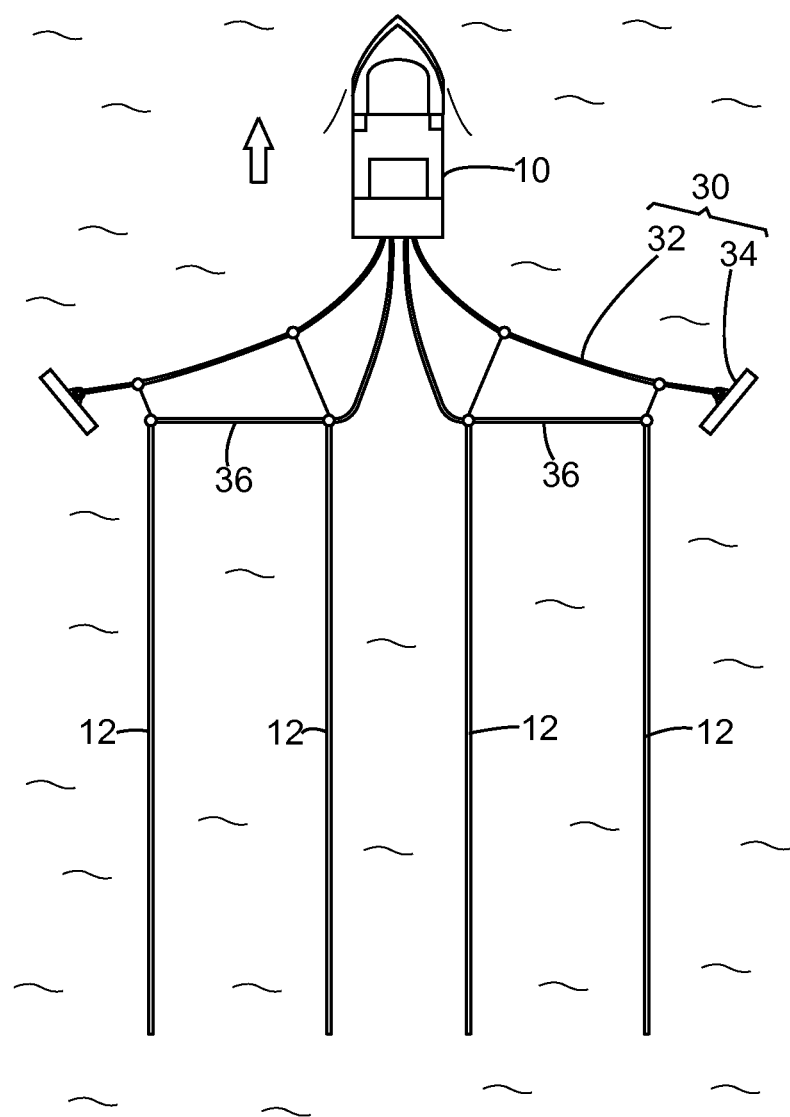
FIG. 2 is a schematic diagram of another conventional marine seismic acquisition configuration.
Figure 3:
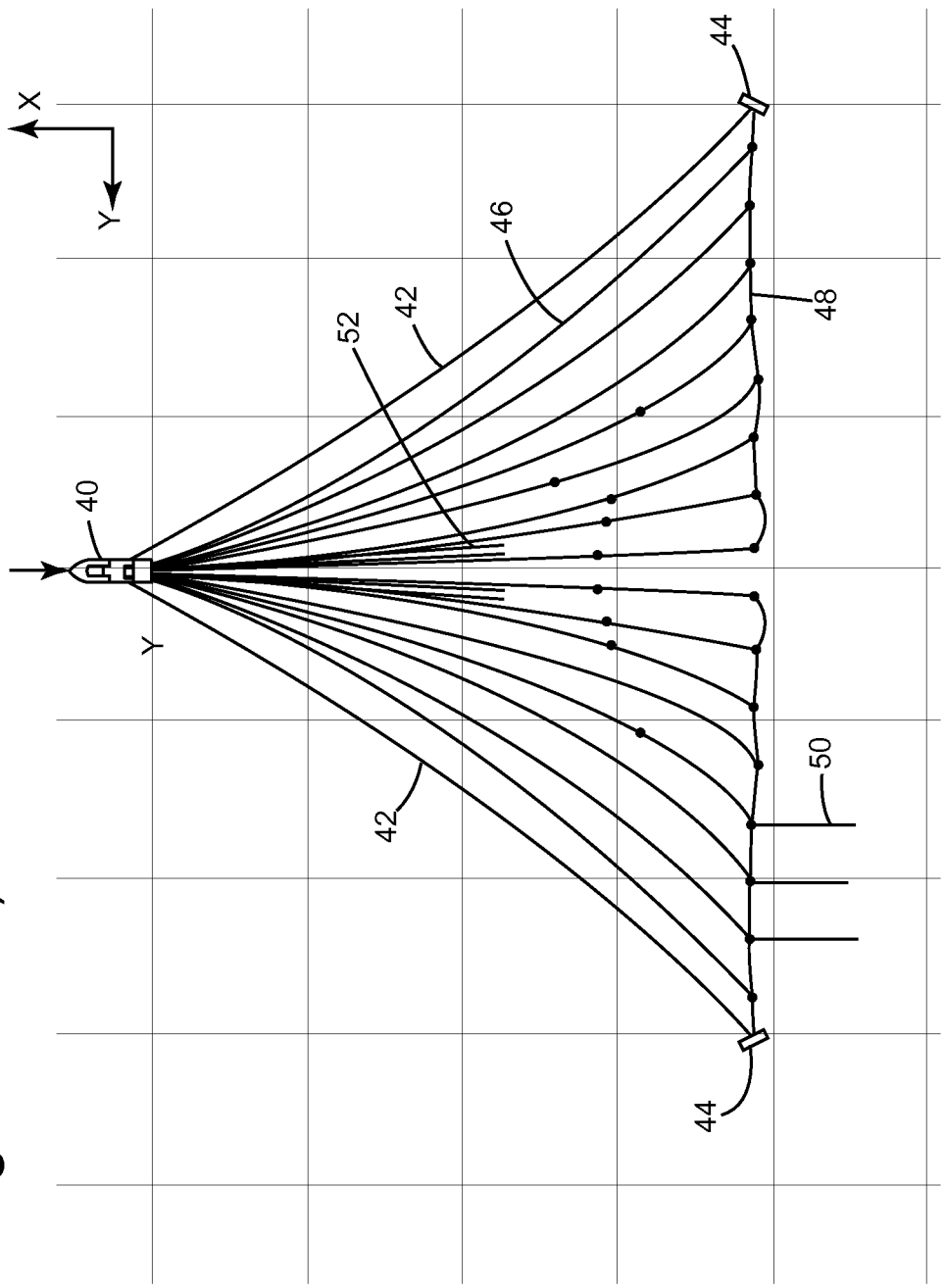
FIG. 3 is a schematic diagram of still another conventional marine seismic acquisition configuration.
Figure 4:
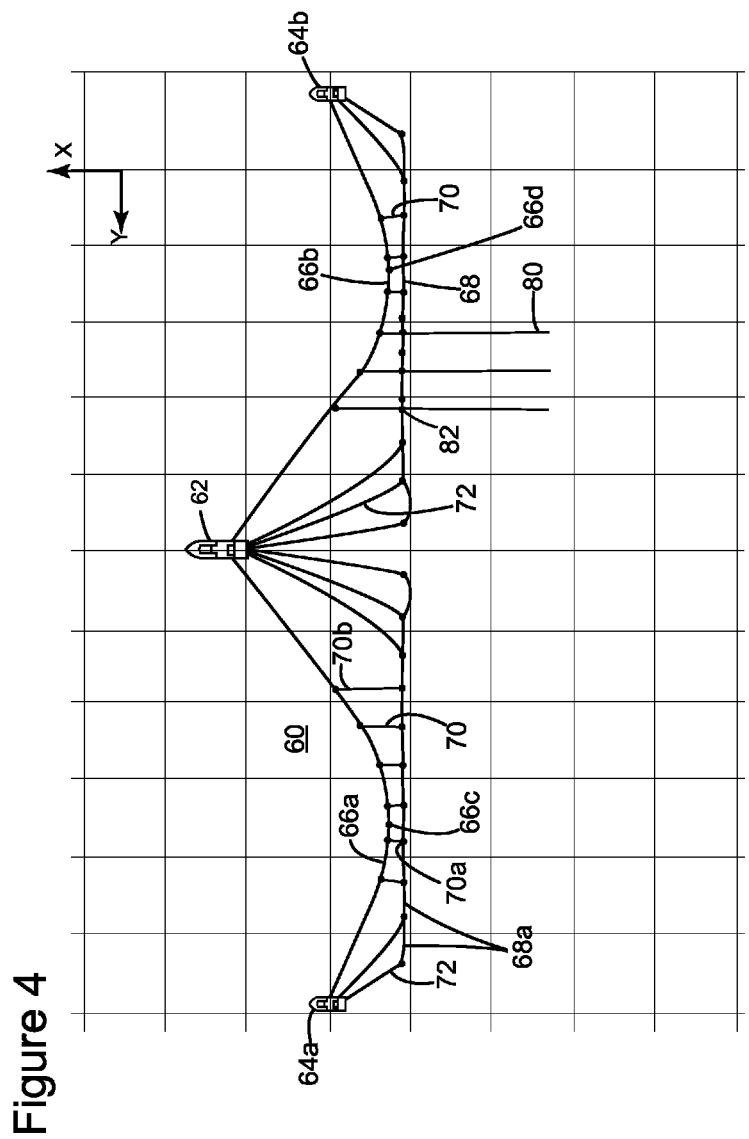
FIG. 4 is a schematic diagram of a marine seismic acquisition system having catenary cables according to an exemplary embodiment.

According to an exemplary embodiment illustrated in FIG. 4, there is a hybrid front-end gear 60 that is attached to a master vessel 62 and two slave vessels 64a-b. At least one of the vessels is a seismic vessel transporting multiple streamers on board. The second vessel can be either a tug boat or a seismic vessel in cases where a big number of streamers are to be deployed at sea.

A first cable 66a (called catenary tow line) is provided between the master vessel 62 and slave vessel 64a and a second cable 66b (catenary tow line) is provided between the master vessel 62 and slave vessel 64b. In the following, a cable is considered an element capable of transferring data and/or electrical power and also capable of sustaining a given load, i.e., having a structural role in transferring loads. A rope or link is considered to be an element that transfers a load but not capable of transmitting data and/or electrical power. In one application, the hybrid front-end gear 60 includes only a slave vessel 64a and the first cable 66a, as will be discussed later with regard to FIG. 6.

One or more transversal ropes 68 are connected from the first cable 66a and from the second cable 66b via links 70. Links 70, which may be ropes or cables or both or other means known in the art, have different lengths depending on their location on the Y axis. For example, link 70 may include a cable part and also a rope part, where the rope part is used to adjust a position of the corresponding streamer and the cable part is configured to transmit data and/or power. Links 70 may be configured to form a single unit with streamers 80. For the embodiment shown in FIG. 4, the first cable 66a has a point 66c that is furthest on the X axis from vessel 62 and the second cable 66b has a similar point 66d. Links 70a are shortest next to these points 66b and 66c, e.g., 35 m. However, there are links 70b that are much longer, for example, around 160 m as also shown in FIG. 4. Direct links 72 between the vessels and the transversal ropes 68 are also provided. These links 72 may have lengths between, for example, 200 and 400 m depending on their location on the Y axis.

It is noted that the ends of both the first and second cables 66a and 66b are fixed only to the master vessel and the corresponding slave vessel. Thus, these cables take a substantially catenary shape. It is noted that due to various elements (load, friction, connections, etc.), a cable or rope will not take a catenary shape but a shape that approximates the catenary shape, i.e., substantially catenary shape. A catenary shape is considered a curve that an idealized hanging chain or cable assumes when supported at its ends and acted on only by its own weight. In the present case, the drag on each section of the first and second cables acts as the weight. If ropes 68 would be connected only from the cables 66a and 66b, such a gear would be called a catenary gear. The presence of the direct links 72 connecting parts of the ropes 68 to the vessels determine the gear 60 to be called "hybrid."

As the first cable 66a and the second cable 66b may have a length of about 1300 m, a total span of the transversal ropes 68 may be about 2100 m. These numbers are illustrative and not intended to limit the exemplary embodiments. For the above noted numbers, an offset between the vessel 62 and the transversal ropes 68 may be around 380 m and an offset between the vessel 64a and the transversal ropes 68 may be around 170 m. Noting that these numbers are illustrative and not intended to limit the exemplary embodiments, it is observed that such small offsets are not the norm in the industry and the span of the transversal ropes 68 is significant. The transversal ropes 68 are connected between streamers 80 at connections 82. The transversal ropes 68 may be made of a single cable or of multiple cables connected to each other. For example, ropes 68a may be provided between adjacent links 70 or 72.

The configuration shown in FIG. 4 may support, for example, 22 streamers 80, each streamer 8,000 m long and a distance between two adjacent streamers may be around 100 m. For this configuration, a drag on the master vessel is about 50 tons and a drag on each of the slave vessel is about 14 tons. However, the system shown in FIG. 4 does not allow a transversal control of an individual streamer as a change in the length of a separation rope 68 will impact the positions of all the streamers as the streamers are interconnected. Also, the numbers discussed in this paragraph are for illustration and more or less streamers 80 may be attached.

Still with regard to FIG. 4, the seismic source(s) can either be towed by the vessels towing the streamer system, or by independent source vessels positioned around the seismic spread. The connections between links 70 and cables 66a and 66b are purely structural in the embodiment described above, as the links 70 have a structural role of transmitting towing forces from the cable 66a to the streamer heads. Standard structural rope connectors available in the offshore industry and having quick connect/disconnect capability can be used to connect the links 70 to cables 66a and 66b. This last feature eases the deployment and recovery of the seismic spread devised according to the current invention.

The hybrid front-end gear 60 need not only to provide the mechanical strength for towing the streamers but also to provide electrical and/or data transmission capabilities. In this regard, it is noted that each receiver on the streamers may need electrical power and also may need to exchange data with the vessel. Thus, electrical and data cables are connecting the vessel to the receivers of the streamers. These electrical and data cables may be built together with the cables of the front-end gear, e.g., the electrical and data cables may be provided inside the cables of the front-end gear. Alternatively, the electrical and data cables may mirror the cables of the hybrid front-end gear and may be attached on an outside of these cables.

For example, FIG. 5 shows an overall view of the hybrid front-end gear 60 and streamers 80. The streamers 80 have a connection 82 to the links 70 and each connection 82 may be linked to a corresponding buoy 84 by a rope 86. Additional buoys may be added at the other end of the streamers and also at various other points along the streamers for maintaining the streamers at a desired depth or depths under water. The streamers 80 are extending under water, at a certain depth that is determined by the length of ropes 86. Actuators, e.g., winches (not shown), may be provided to the buoys 84 or connections 82 for adjusting as desired the length of the ropes 86, which in turn adjust the depth of the streamers. Connections 82 may be any of those known in the art and the connections may be configured to be remotely detached from either the streamers or from the links 70. The electrical and data cables 88 may run from connection to connection along cables 68, 66a, 66b and links 70. In one application, electrical and data cables 88 may be replaced by wireless technology and local power sources for the detectors of the streamers.

FIG. 6 illustrates an exemplary embodiment in which the electrical and data cables 88 run along ropes 68 but not along the first cable 66a. Other arrangements of the cables and links are possible as would be appreciated by those skilled in the art. FIG. 6 also illustrates that only a slave vessel 64a is used and the first cable 66a takes a substantially catenary shape when towed by the vessels 62 and 64a and the transversal ropes 68 takes a substantially straight line shape when towed. According to this exemplary embodiment, the second cable 66b is not present.

According to an exemplary embodiment, an arrangement is shown in FIG. 7 that includes individual streamers without spread ropes, i.e., individual streamers that may be controlled independently of adjacent streamers. In this respect, the arrangement 400 shown in FIG. 7 has streamers that are not connected to other streamers so that positions of the individual streamers can be controlled independent of the neighboring streamers. FIG. 7 shows two vessels 402 and 404 towing a catenary cable 406. Part of the streamers 408 are attached by a control mechanism 410 to a lead-in cable 412. The control mechanism 410 may be a mechanism 110 disclosed in FIG. 9, a bird 260 disclosed in FIG. 15 or other known mechanism. Because no ropes are provided between these mechanism, a position adjustment on the Y axis of one streamer does not affect other streamers. However, some streamers 414 may be connected to each other by spread ropes 416. In order for the streamers close to the vessels to stay deployed, lead-in cables 418 may be used to connect the streamers 414 to the corresponding vessel 402 or 404. Ropes 422 may be used to deploy the streamers 414. This arrangement is a hybrid front-end gear as positions of the streamers 414 are controlled via the lead-in cables 418 while the positions of the streamers 408 are controlled via mechanism 410.

Figure 8:
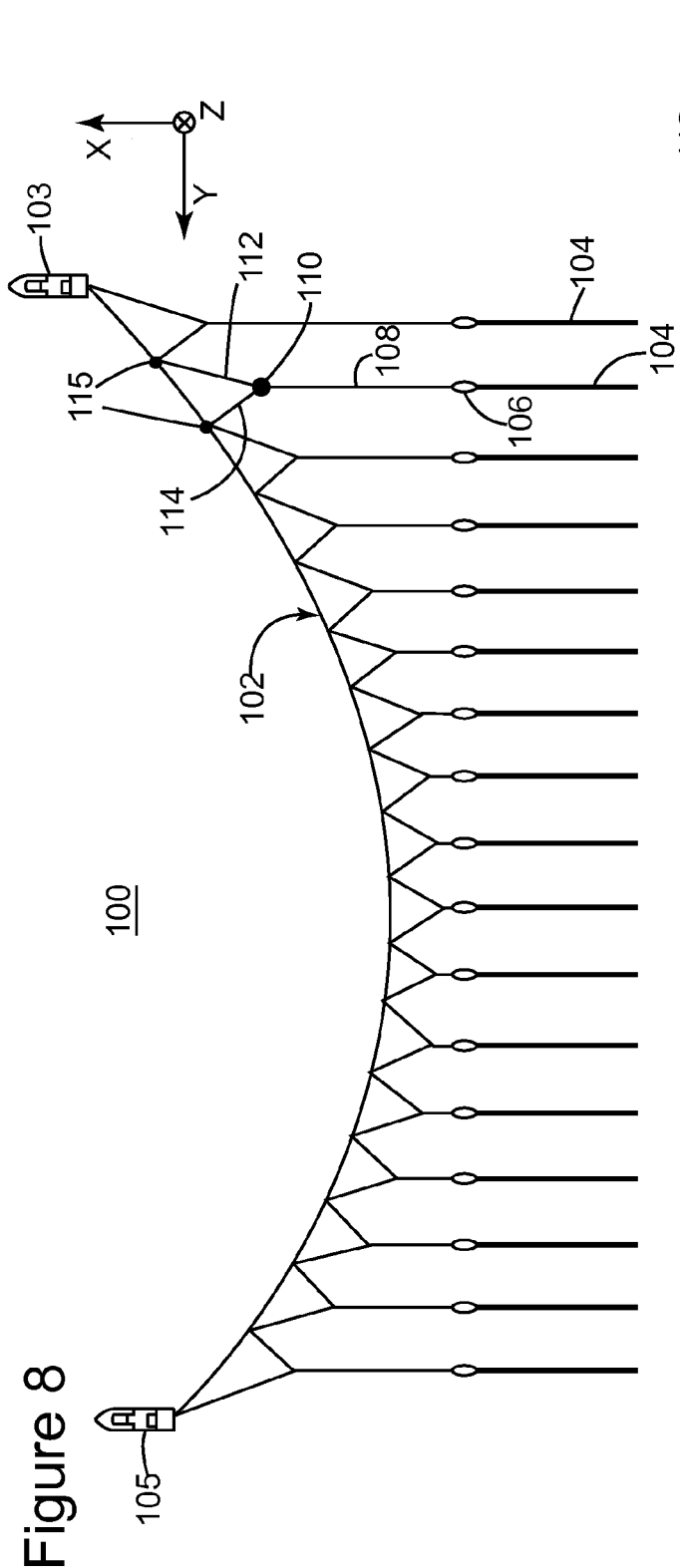
FIG. 8 is a top view of a seismic data acquisition system having a catenary cable according to an exemplary embodiment.

According to another exemplary embodiment illustrated in FIG. 8, a catenary front-end gear 100 has a catenary tow cable (main cable) 102 connected between a master vessel 103 and a slave vessel 105. Plural streamers 104 are connected by a connecting system to the main cable 102 as discussed next. Each streamer 104 is connected via a connection 106 to a corresponding first link 108. Each first link 108 may be connected to a control mechanism 110. The control mechanism 110 is connected by a lead-in cable 112 to the main cable 102 and by a second link 114 also to the main cable 102. Thus, most if not all of the first links 108 are connected by two means (112 and 114) to the main cable 102. The connections 115 between the lead-in 112 and the second link 114 to the main cable 102 are those known in the art. In one application, the link 114 from a first streamer connects to the main cable 102 at the same point as a lead-in cable 112 of an adjacent streamer. However, in another application, the two elements may connect at different points to the main cable. In another application, the main cable, the first link and the lead-in are cables (i.e., able to transmit data and/or power and to transfer a load) and the second link 114 is a rope, e.g., a synthetic rope without data and/or power transmission capabilities. Elements 108, 110, 112, and 114 may form the connecting system. The reason for these novel connections is discussed next.

Figure 9:
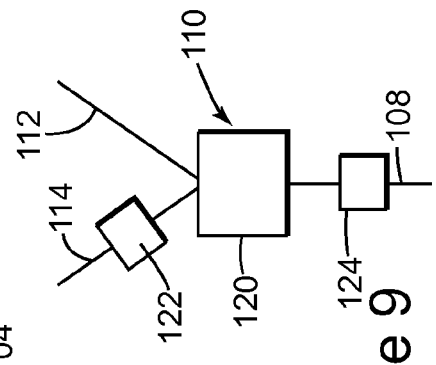
FIG. 9 is a schematic diagram of a connection between various cables of a seismic data acquisition system according to an exemplary embodiment.

According to an exemplary embodiment illustrated in FIG. 9, the control mechanism 110 has a body 120 to which a first actuating device (e.g., winch) 122 and a second actuating device (e.g., winch) 124 may be attached. The first winch 122 is connected between the body 120 and the second link 114 while the second winch 124 is connected between the body 120 and the first link 108. Both winches may be activated from the vessels, either to retract or release the corresponding cables and/or ropes. By activating the second winch 124, a length of the first link 108 is modified, so that the streamer 104 is moved closer or farther along direction X from vessel 103. By activating the first winch 122, a length of the second link 114 is modified, so that the streamer 104 is moved laterally (left or right) along direction Y relative to the vessel 103. When the first winch 122 is activated, the streamer 104 also may move along the X axis. Thus, a control of the streamer 104 is achieved along both the X and Y directions. It is noted that in FIG. 8 the vessel 103 advances along axis X and axis Z indicates a depth at which the streamer 104 is towed relative to a surface of the water. It is also noted the control mechanism 110 may also be used for the exemplary embodiments shown in FIGS. 4-6.

Winches 122 and 124 do not have to be provided at the control mechanism 110. For example, the first winch 122 may be provided between the main cable 102 and second link 114. In another embodiment, only one winch is provided, either the first winch or the second winch. Other arrangements may be employed (e.g., placing second winch 124 on cable 112) as will be recognized by those skilled in the art as long as control of the streamer 104 is achieved.

Figure 10:
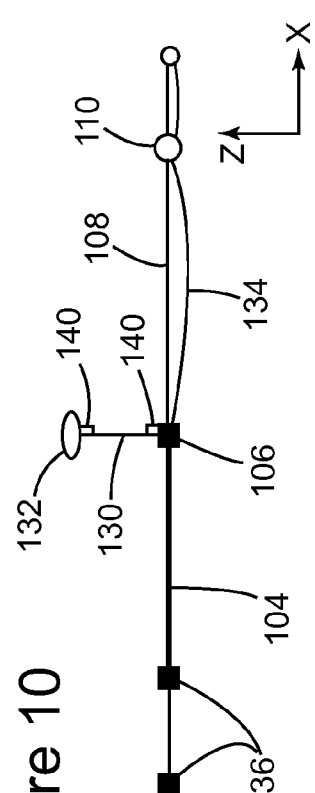
FIG. 10 is a side view of a streamer and a lead-in cable of a seismic data acquisition system according to an exemplary embodiment.

FIG. 10 illustrates a side view of the arrangement 100 of FIG. 8. It is noted that connection 106 is linked by link 130 to a buoy 132 for maintaining the connection 106 at a desired depth under water. Electrical and data cables 134 (lead-in) are attached to the first link 108 and other cables and these data cables 134 are configured to carry electric power and/or data to and from receivers 136 of the streamers 104. Alternatively, if the second winch 124 is provided on cable 112 as noted above, this cable 112 may become a rope, 108 becomes a lead-in cable and there is no need for cable 134. A winch 140 may be provided either at buoy 132 or at the connection 106 for adjusting a depth of the connection 106 relative to a surface of the water.

Thus, the catenary front-end gear 100 is capable of individually adjusting a position of the streamer head (connection 106) on X, Y and Z axes. Other embodiments in which birds are used to control the position of the streamers may be used.

Figure 11:
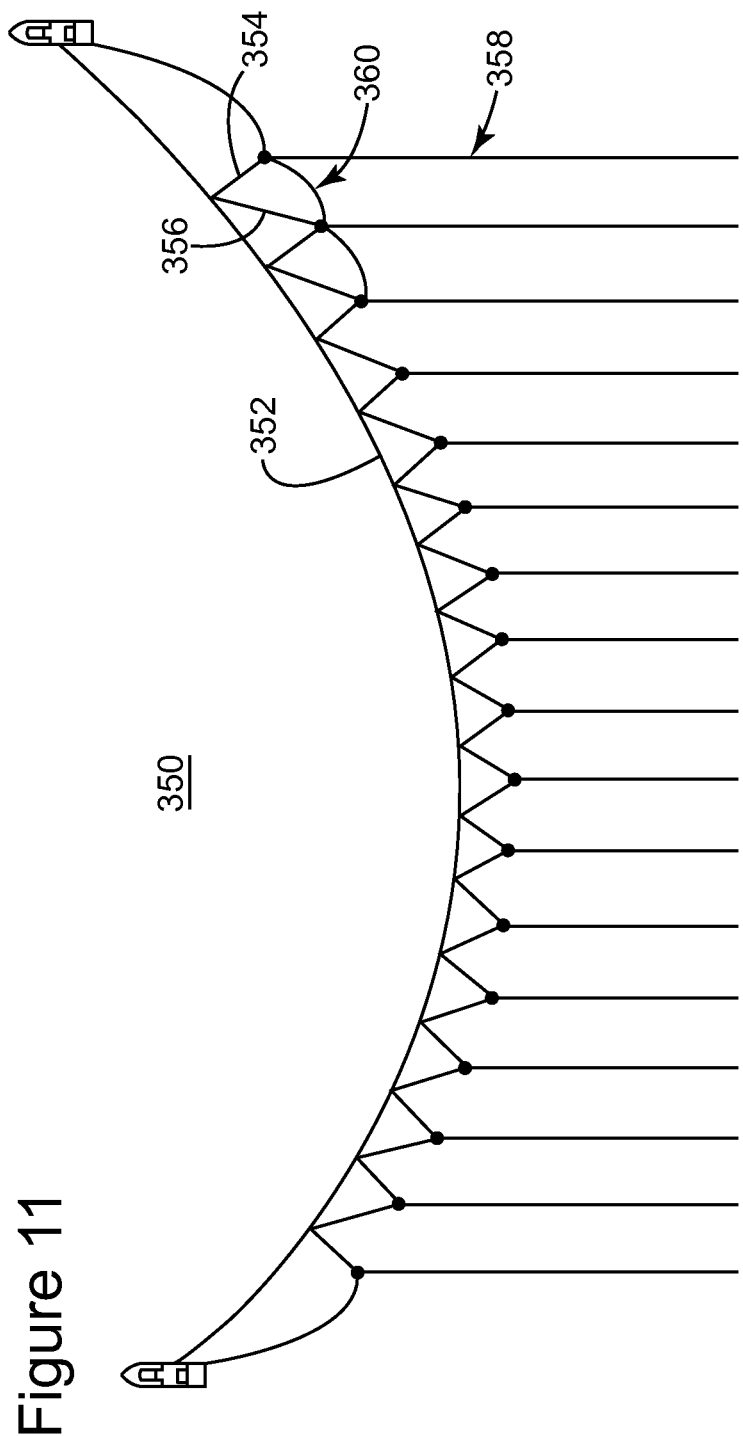
FIG. 11 is a top view of still another seismic data acquisition system according to an exemplary embodiment.

Another arrangement 350 is shown in FIG. 11 in which the catenary tow rope 352, and the connections 354 and 356 to the streamer 358 are made of the synthetic rope. A lead-in connection 360 is loose. The lead-in connection 360 ensures that data and/or power are transmitted between the vessel and the sensors of the streamers. For the arrangement shown in FIG. 11, an estimated total drag of 120$t$ has been determined, which is similar to a conventional 14×8000×100 streamer arrangement. However, the arrangement 350 has seven more streamers than the conventional streamer arrangement, i.e., it is a 21×8000×100 streamer arrangement. The total drag reduction is evident from this example.

Figure 12:
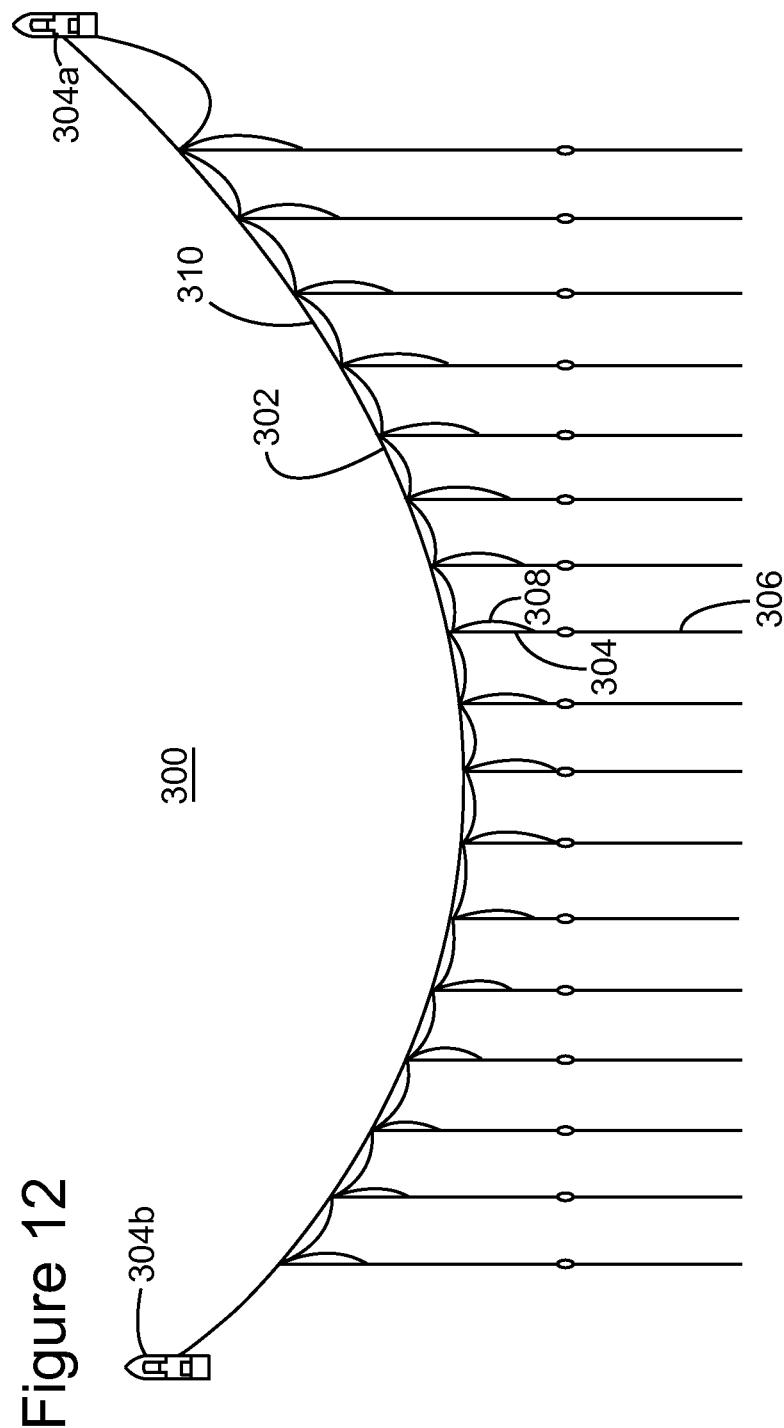
FIG. 12 is a top view of another seismic data acquisition system according to an exemplary embodiment.

In term of the arrangement of the main cables, the streamer lead-in cables, and the streamers, the previous figures shown only some possible combinations. It is noted that these combinations show the heads of the streamers aligned along a line. However, other configurations for the heads of streamers are possible, e.g., arc of a circle, catenary shape, etc. Other combinations are discussed now with regard to FIG. 12. FIG. 12 illustrates an exemplary embodiment in which an arrangement 300 has the main catenary tow rope 302 connected to two vessels 304$a$ and 304$b$. This arrangement is also applicable to more than two vessels or for a vessel and one or more deflectors. The main cable 302 may be a synthetic cable configured to be strong (e.g., Dyneema fibers, see www.dyneema.com). The link 304 of the streamer 306 is connected to the catenary tow rope 302 while the data cables 308 and 310 are loosely connected to the link 304 and the catenary tow rope 302. The data cables 308 and 310 may include cables not only for transmitting data but also for transmitting power, compressed air, gas, etc.

Figure 13:
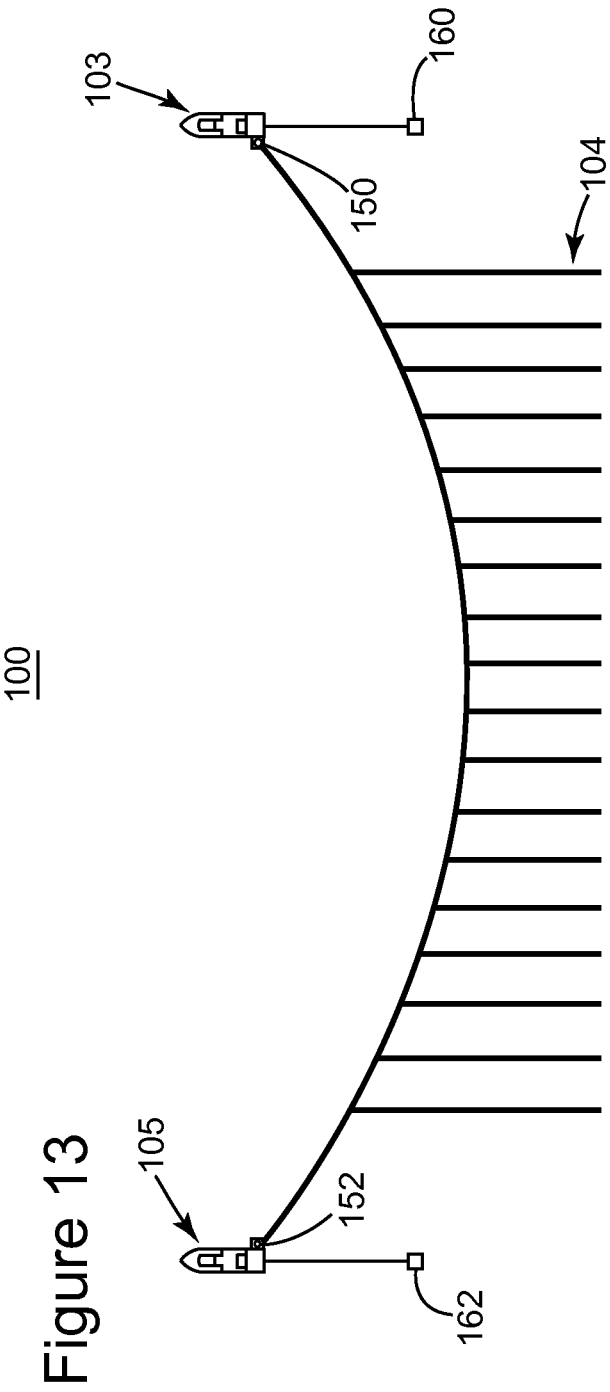
FIG. 13 is a top view of a seismic data acquisition system having a catenary cable for streamers and a seismic source according to an exemplary embodiment.

According to an exemplary embodiment illustrated in FIG. 13, a global position control for the entire gear is discussed. FIG. 13 shows that one or both vessels 103 and 105 have corresponding actuating devices (e.g., winches) 150 and 152 attached to the main cable 102 for changing a length of the main cable 102. It is noted that FIG. 13 does not show, for simplicity, the actual connection between the streamers 104 and the main cable 102. FIG. 13 also shows a seismic source 160 towed by the master vessel 103 and another seismic source 162 towed by the slave vessel 105. Other possible configurations for the seismic sources are possible.

Figure 14:
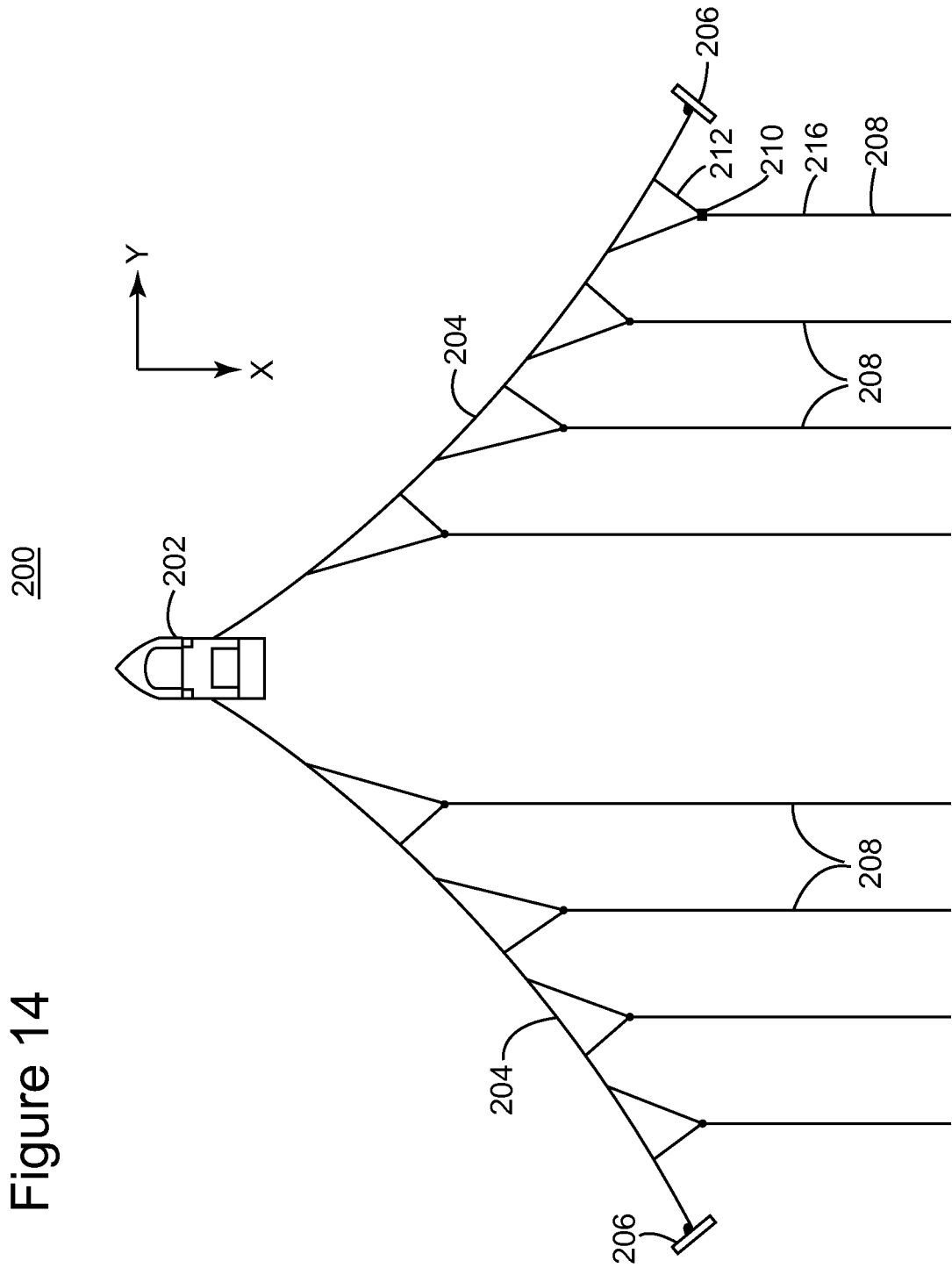
FIG. 14 is a top view of a seismic data acquisition system that uses deflectors according to an exemplary embodiment.

According to another exemplary embodiment, the configuration shown in FIG. 8 may be implemented with a front-end gear configuration that does not use two or more vessels. This arrangement 200 (single vessel tow configuration) is shown in FIG. 14 in which a single vessel 202 tows one or more cables 204. Cable 204 is connected with the other end to a deflector 206 or another similar device. Thus, the shape of the cable 204 resembles with a catenary arrangement as shown in FIG. 4 or 6. Streamers 208 are connected to cables 204 in a similar fashion as shown in FIG. 8 (triangular position control system), i.e., each streamer may have a control mechanism 210 that connects to a first link 216, a lead-in 212 and a second link 214. The control mechanism 210 may be activated as discussed above with regard to FIG. 9 for controlling the X and Y positions of the streamer 104. Buoys 132 as shown in FIG. 10 may be used to control the Z position of the streamer 208.

Figure 15:
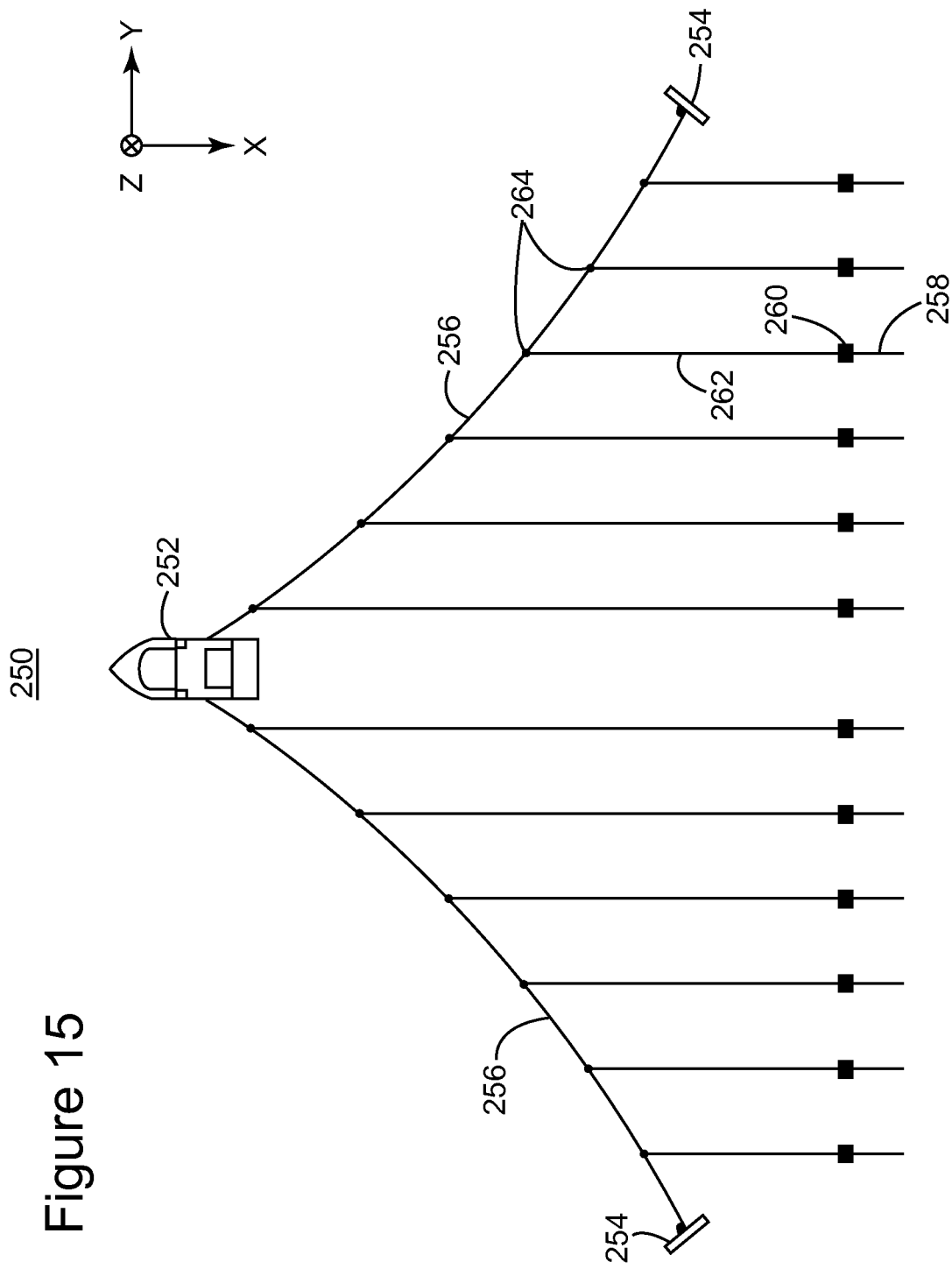
FIG. 15 is a top view of a seismic data acquisition system that uses birds for positioning the streamers according to an exemplary embodiment.

According to another exemplary embodiment illustrated in FIG. 15, instead of using the connecting system (110, 112, and 114) shown in FIG. 9 for positioning a streamer, a bird may be used as shown in the arrangement 250. This arrangement includes a master vessel 252 connected to deflectors 254 for shaping cables 256 in a catenary way. It is noted that instead of the deflectors 254, slave vessels as shown in FIG. 4 may be used. Streamers 258 are connected to corresponding birds 260. Not all streamers have to be connected to a bird. In other ways, it is possible that some streamers are left uncontrolled or the positions of some streamers are controlled by known methods. Thus, the connecting system may include elements 260, 262 and 264. This connecting system may also be used for the exemplary embodiments shown in FIGS. 4-6.

A bird is a device deployed underwater that is capable to change its position based on instructions received from the vessel (e.g., the master vessel) or based on instructions stored at a local control device of the bird (e.g., the bird may have sensors that determine its actual position and a control mechanism adjusts the position of the bird to achieve a desired position). The bird may have wings that are actuated by an appropriate motor for adjusting its position (see U.S. Pat. No. 7,267,070 assigned to the assignee of this application, the entire content of which is incorporated herein by reference).

The bird 260 may be connected to cable 256 via a link 262. An actuator device 264 (e.g., a winch) may be provided between the cable 256 and link 262 so that a position of the streamer 258 along axis X may be controlled. The bird 260 is configured to move laterally (along axis Y) or up and down (along axis Z) as necessary.

One advantage of one or more of the exemplary embodiments discussed above is that a longitudinal offset (distance between the towing vessels and the heads of the streamers) is reduced. For example, for the exemplary embodiment illustrated in FIG. 8, such a distance may be less than 200 m, which is substantially less than a corresponding distance for conventional arrangements, which may be around 700 m. In addition, a vertical footprint may be reduced with such a configuration.

Figure 16:
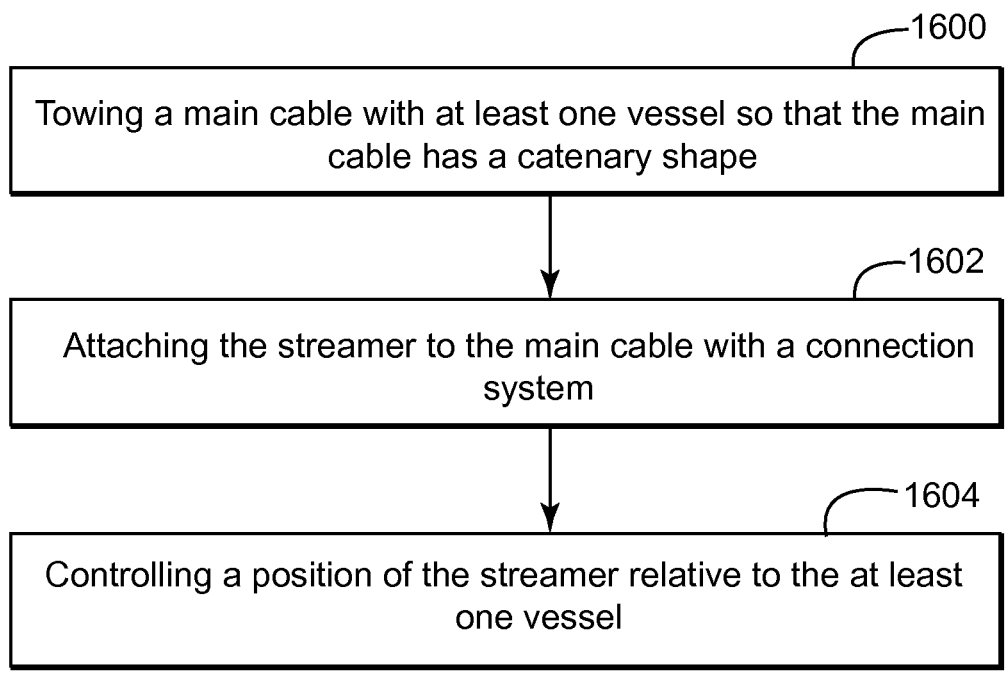
FIG. 16 is a flow chart illustrating a method for controlling streamers of a seismic data acquisition system according to an exemplary embodiment.

According to an exemplary embodiment illustrated in FIG. 16, there is a method for adjusting a position of a streamer when towed under water. The method includes a step 1600 of towing a main cable (102) with at least one vessel (103) so that the main cable (102) has a catenary shape; a step 1602 of attaching the streamer (104) to the main cable (102) with a connection and position control system (112, 114, 110, 108 or 264, 262, 260); and a step 1604 of controlling a position of the streamer (104) relative to the at least one vessel.

The disclosed exemplary embodiments provide a system and a method for towing an array of streamers underwater. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A catenary front-end gear for towing streamers under water, the catenary front-end gear comprising:
    a main cable configured to span between a first vessel and a device;
    a connecting system configured to connect plural streamers to the main cable; and
    the plural streamers,
    wherein the main cable takes a substantially catenary shape when towed by the first vessel underwater and the connecting system is further configured to connect each one of the plural streamers to the main cable at two separate points on the main cable.

2. The catenary front-end gear of claim 1, wherein the connecting system comprises:
    at least one first link configured to be attached to a corresponding streamer;
    at least one first lead-in cable configured to attach the at least one first link to the main cable; and
    a second link configured to also attach the at least one first link to the main cable.

3. The catenary front-end gear of claim 2, wherein the device is a deflector.

4. The catenary front-end gear of claim 2, wherein the device is a second vessel.

5. The catenary front-end gear of claim 2, further comprising:
    a control mechanism configured to connect to (i) the at least one first link, (ii) the at least one first lead-in cable, and (iii) the second link and to control movement of the corresponding streamer in two directions.

6. The catenary front-end gear of claim 5, wherein the control mechanism comprises:
    a first actuator connected between a body of the control mechanism and the second link; and
    a second actuator connected between the body and the at least one first link.

7. The catenary front-end gear of claim 1, further comprising:
    a connection provided between the at least one first link and the streamer;
    a buoy connected by a cable to the connection and configured to maintain the connection at a predetermined depth under water; and
    an actuator between the buoy and the connection and configured to be controlled to adjust the predetermined depth of the connection.

8. The catenary front-end gear of claim 1, further comprising:
    a data cable configured to extend from the streamer or a control mechanism to the first vessel.

9. The catenary front-end gear of claim 1, wherein the connecting system further comprises:
    an actuator connected to the main cable;
    a link connected to the actuator;
    a bird connected to the link, wherein the bird is configured to laterally and/or vertically change its position; and
    a streamer connected to the bird,
    wherein the actuator is configured to adjust a longitudinal position of a head of the streamer relative to the first vessel.

10. The catenary front-end gear of claim 9, wherein the device is a deflector.

11. The catenary front-end gear of claim 9, wherein the device is a second vessel.

12. A method for adjusting a position of a streamer when towed under water, the method comprising:
    towing a main cable with at least one vessel so that the main cable has a catenary shape;
    attaching the streamer to the main cable at two separate points on the main cable with a connection and control system; and
    controlling a position of the streamer in two directions relative to the at least one vessel using the control system.

13. The method of claim 12, further comprising:
    achieving the catenary shape by spanning the main cable between two vessels or between the at least one vessel and a deflector.

14. A hybrid front-end gear for towing a plurality of streamers underwater along an X axis, the hybrid front-end gear comprising:
    a first cable configured to connect to a first vessel and a second vessel;
    transversal ropes configured to extend along an Y axis that is substantially perpendicular to the X axis;
    a plurality of links configured to connect the transversal ropes to the first cable at a plurality of separate points on the first cable; and a plurality of direct links separate from the plurality of links and configured to connect one or more of the traversal ropes directly to at least one of the first vessel and the second vessel, wherein the first cable takes a catenary shape when towed underwater, the transversal ropes extend substantially straight along the Y axis and the traversal ropes are configured to connect to the plurality of streamers.

15. The hybrid front-end gear of claim 14, further comprising:
   a second cable configured to connect to the first vessel and a third vessel.

16. The hybrid front-end gear of claim 15, wherein:
   the plurality of links are further configured to connect the transversal ropes to the second cable at a plurality of separate points on the second cable; and
   the plurality of direct links connect one or more of the transversal ropes directly to the first vessel, the second vessel and the third vessel.

17. The hybrid front-end gear of claim 14, further comprising:
   plural streamers connected between the transversal ropes; and
   a connecting system for connecting the plural streamers to the transversal ropes,
   wherein the connecting system includes actuators and/or birds.

18. The hybrid front-end gear of claim 14, further comprising:
   at least one first link configured to be attached to a corresponding streamer;
   at least one lead-in cable configured to attach the at least one first link to the main cable; and
   a second link configured to also attach the at least one first link to the first cable.

19. The hybrid front-end gear of claim 18, further comprising:
   a control mechanism configured to connect to (i) the at least one first link, (ii) the at least one lead-in cable, and (iii) the second link, wherein the control mechanism comprises,
   a first actuator connected between a body of the control mechanism and the second link; and
   a second actuator connected between the body and the at least one first link.

20. The hybrid front-end gear of claim 14, further comprising:
   a connection provided between the at least one first link and the streamer;
   a buoy connected by a cable to the connection and configured to maintain the connection at a predetermined depth under water; and
   an actuator between the buoy and the connection and configured to be controlled to adjust the predetermined depth of the connection.

\* \* \* \* \*